May 4, 1965

J. R. COFFING 3,181,249

FLAT-FACED ATTITUDE INDICATOR

Filed July 27, 1961

Inventor
James R. Coffing
Dominik, Lazo & North
Attorneys

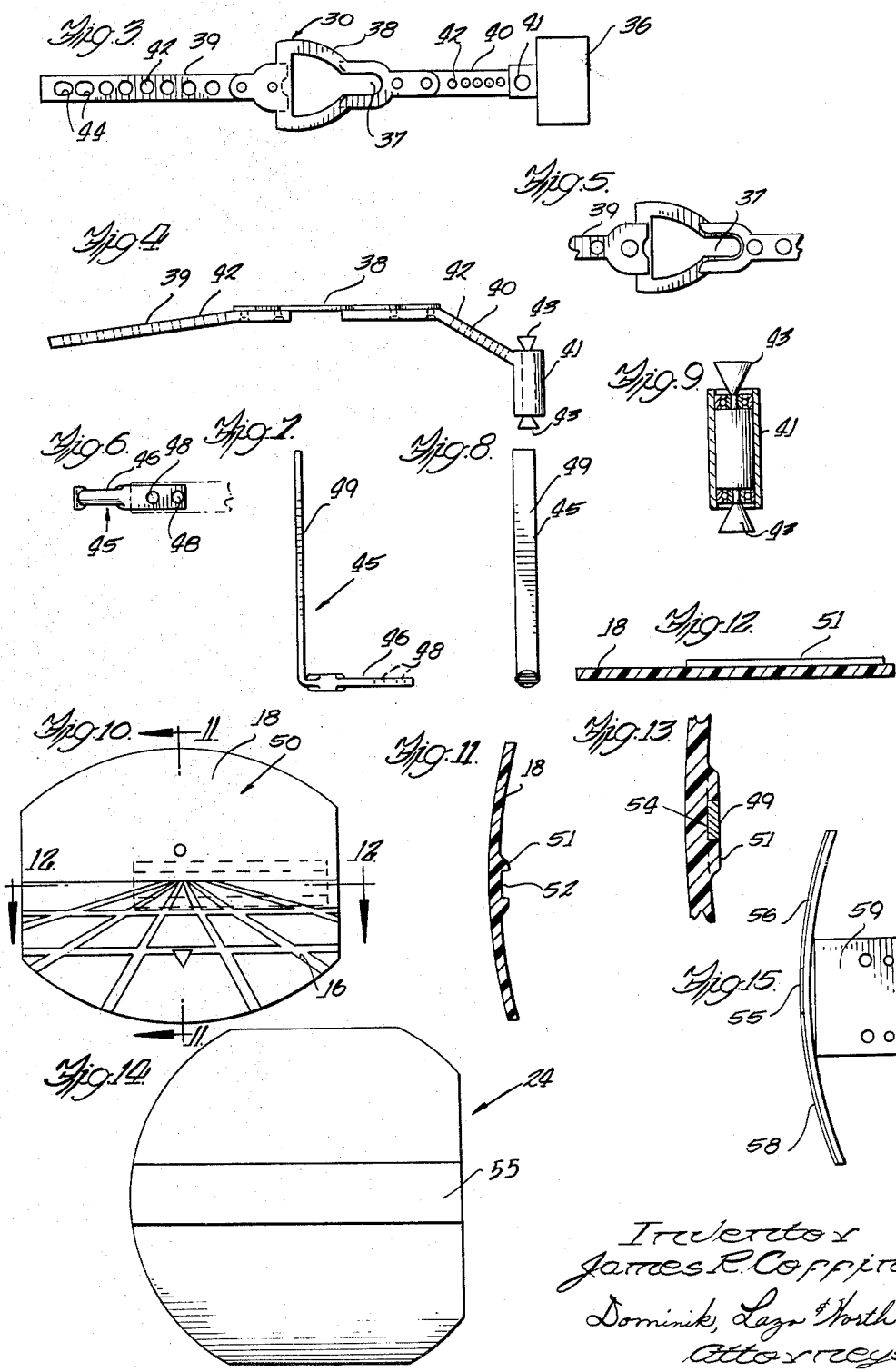

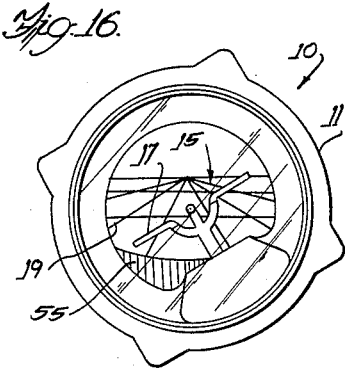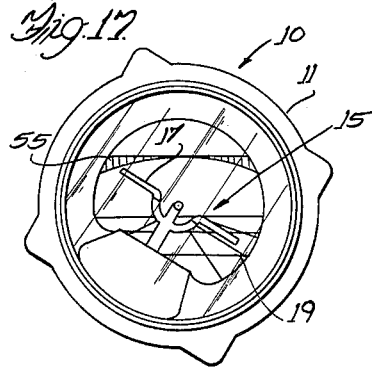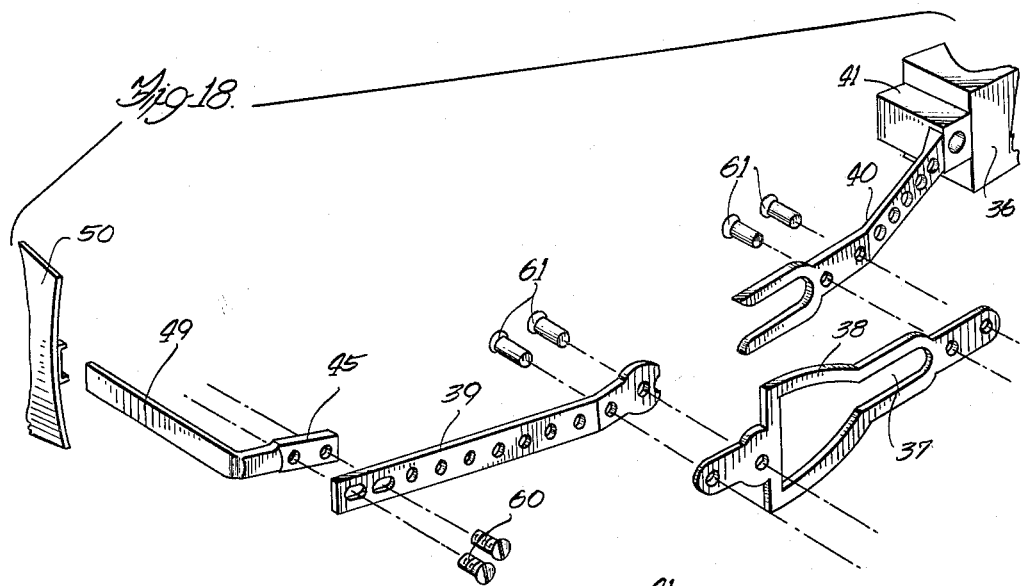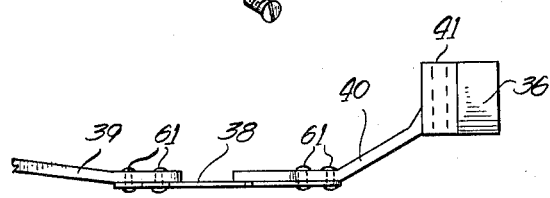

United States Patent Office 3,181,249
Patented May 4, 1965

3,181,249
FLAT-FACED ATTITUDE INDICATOR
James R. Coffing, R.R. 2, Box 158D, Covington, Ind.
Filed July 27, 1961, Ser. No. 127,200
2 Claims. (Cl. 33—204)

The present invention forms a continuation-in-part of the invention described and claimed in my earlier-filed application; namely, No. 757,871, filed August 28, 1958 (now abandoned), and No. 91,298, filed February 20, 1961.

The subject invention relates to aircraft instrumentation, and more particularly to an attitude type indicator better known as an artificial horizon.

The artificial horizon which has been adopted as a standard by the industry for the last twenty to thirty years employs a silhouette of an airplane and a single bar in order to create an impression of the relationship between the host aircraft and the horizon. In such an instrument the host aircraft remains stationary in the instrument, and the horizon maintains a level position as motivated by an associated gyroscope, normally vacuum driven in the host instrument. Such instruments are subject to ambiguous readings by the unskilled pilot, and with the advent of increased business flying more and more pilots are entering into the overcast without extensive experience in following the instruments. Indeed, many such pilots inadvertently are caught in the overcast, and with only a few hours of experience have met with fatal results on becoming confused and subject to vertigo in the course of attempting to fly without reference to an actual horizon.

In view of the foregoing, it is an object of the present invention to provide an attitude indicator which more faithfully duplicates the external scene, and therefore will cause the pilot to react in a more natural fashion to the display of the relationship between the host aircraft and the horizon.

Another object of the present invention is to provide an attitude indicator in which the horizon is amplified in its appearance by means of lines which converge at a vanishing point, thereby giving the effect of flying over an open flat field with several section lines or fences, much like the new pilot is accustomed to seeing throughout his journeys in good weather. A related advantage is achieved through such a configuration in that the transition time between visual flight and instrument flight is substantially reduced.

Still a further object of the present invention is to provide an attitude indicator which substantially reduces the fatigue of the pilot, and which is further color-coded in order to provide a more striking difference between the terrain reference and the sky reference which meet at the artificial horizon. Additional color-coding is provided to achieve a striking warning of extreme attitudes.

Still a further object of the present invention is to furnish an adaptation for a standard well-accepted artificial horizon which will provide all of the foregoing advantages, and do so in a construction which is inherently inexpensive to fabricate, manufacture, and install as a modification to the host unit.

A further and more detailed object of the invention is to furnish an attitude indicator in the conversion form as indicated above which is rugged, simple, and highly durable in operation, and induces no additional operating difficulties to the host instrument above and beyond those normally experienced with a well-perfected and tried instrument.

Further objects and advantages of the present invention will become apparent as the following description of an illustrative embodiment proceeds, taken in conjunction with the accompanying drawings which illustrate one commercial embodiment of the unit, in which:

FIG. 3 is a front elevation of the pointer bar assembly.

FIG. 4 is a top view of the pointer bar assembly illustrating diagrammatically its suspension for pivoting.

FIG. 5 is a front elevation, partially enlarged and partially broken of the pointer bar assembly connection with the gyro.

FIG. 6 is a front elevation partially broken and in an enlarged scale of the connection between the pointer bar connecting rod and the attachment to the movable mask.

FIG. 7 is a top view of the pointer bar connecting rod and movable mask connection as shown in FIG. 6.

FIG. 8 is a side elevation of the pointer bar connecting rod as shown in FIG. 7.

FIG. 9 is a transverse sectional view of the pointer bar bearing illustrating in enlarged scale the relationship between the bearing and its suspension points.

FIG. 10 is a front elevation, partially diagrammatic, of the movable mask.

FIG. 11 is a transverse sectional view taken along section line 11—11 of FIG. 10 of the movable mask.

FIG. 12 is a sectional view, taken along section line 12—12 of FIG. 10, of the movable mask.

FIG. 13 is an enlarged, partially broken, partially sectioned view showing the assembled relationship between the movable mask and the movable mask connection.

FIG. 14 is a front elevation of the mask fixed to the major gimbal illustrating the orientation of the contrasting colored warning band.

FIG. 15 is a side elevation of the mask of FIG. 14 and its mounting bracket.

FIG. 16 is a front elevation of the assembled unit showing diagrammatically how the warning band displays itself when an extreme attitude of dive is experienced.

FIG. 17 is a front elevation diagrammatically illustrating how the warning band appears when an extreme attitude of climb and bank together are experienced.

FIG. 18 is a partially perspective, partially broken, exploded view of the pointer bar connection to the movable mask illustrating the key components relating thereto.

FIG. 19 is a top view of the pointer bar connector and assembly shown in FIG. 18 to contrast the assembled relationship to the exploded view.

Figures 1, 2:
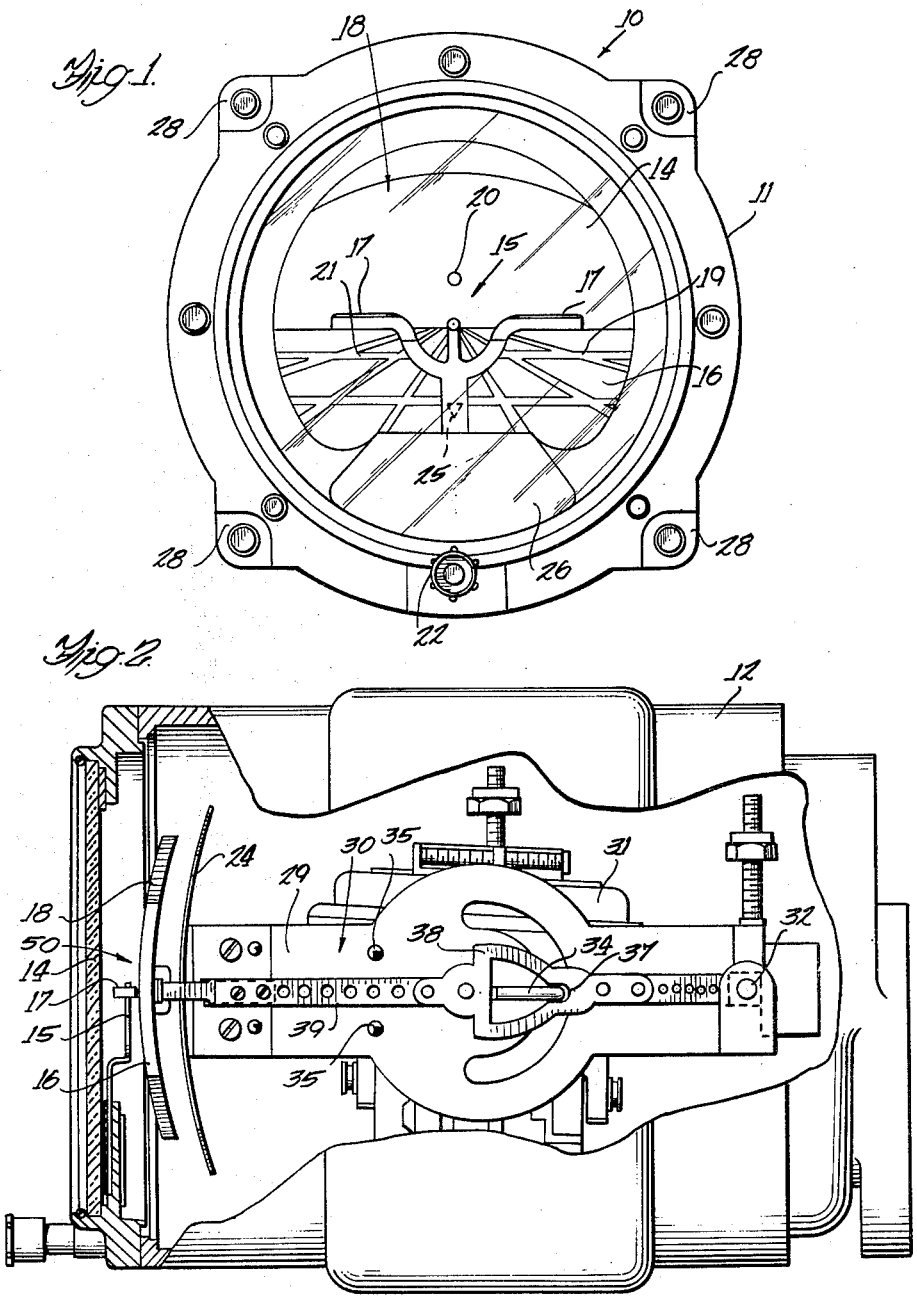
FIG. 1 is a front elevation of the attitude indicator modified with an adaptation illustrative of the present invention.
FIG. 2 is a side elevation of the attitude indicator shown in FIG. 1, partially broken, and partially sectioned in order to reveal the interior and significant operative elements thereof.

As was indicated above, the present invention contemplates a very graphic demonstration of the attitude of the host aircraft for reading by the pilot. The invention stems from the adoption of a movable mask rather than a single horizon bar in an artificial horizon. This presents an unambiguous relationship between the sky and the earth. Additionally, by employing appropriately orienting grid lines, a terrain mask on the front portion of the movable mask is provided which gives a vanishing point and therefore a clear-cut representation of the earth as understood diagrammatically by most persons. In addition, the various lines to the vanishing point are positioned at such angles so that the pilot will have an instantaneous and direct reading of his angle of bank, and additionally of his angle of climb or dive with relation to the various power settings, and appropriate attitudes of the aircraft as determined experimentally by visual flight. By utilizing a unique physical relationship between the movable mask and the permanent mask, and further by employing a brightly contrasting color band on the permanent mask, a warning flag on the fixed mask is provided which immediately displays itself when excessive pitch is encountered in either extreme attitudes of climb or dive. For example, it can be so proportioned that when the climb or dive exceeds 25° the brightly contrasted warning flap appears. In addition, the horizontal grid lines serve as descent pitch guide indicia, and climb is coordinated with a dot placed above the vanishing point in order to gradiate the attitudes of climb and dive between the extreme attitudes which are disclosed by the warning flag. The entire unit is so assembled and designed that it can be placed onto an existing artificial horizon with a minimum of structural changes, and employing inherently all of the time-tested and safe durable features of the existing artificial horizon.

Referring now to FIG. 1, it will be seen that the basic artificial horizon 10 appears as normally anticipated. A bezel 11 is provided and is attached to the housing 12. A display window 14 in the front portion of the bezel 11 reveals a miniature aircraft symbol 15. The miniature aircraft symbol 15 employs the standard configuration to which most pilots are accustomed, except that, as shown alternatively in FIG. 2, there is some depth to the unit giving a partially 3-dimensional appearance. Additionally the color arrangement of the miniature aircraft by providing bands 17 of brightly colored contrasting glowing paint renders the unit exceedingly easy to read during daylight and night operations.

As will be seen, a sky reference 18 appears on the upper portion of the movable mask, above the grid lines 19 which are oriented at 15°, 30°, and 60° relationships with the horizontal. All of the vertical grid lines intersect at a central vanishing point. In furtherance of the realistic 3-dimensional presentation, the vertical grid lines taper toward the vanishing point as shown in FIG. 1.

It will be further noted that the climb pitch guide reference 20 is oriented approximately 10° above the vanishing point so that the pilot, upon commencing his climb, can judge his power setting and attitude without continuous reference to the rate of climb indicator.

Similarly, descent pitch guide reference lines at 10° and 25° are provided as indicated by reference numeral 21. To further the realism of the 3-dimensional presentation, the remote 10° pitch line is narrower than the closer 25° pitch line. The grid system which is revealed by a combination of the six grid lines 19 and the two descent pitch guide references 21 is very similar to that experienced by the pilot in flying over open fields where there is a normal section line fencing or road network, but with the additional advantage of each of the lines having a significant relationship to the control of the attitude of the aircraft.

The miniature aircraft is adjusted vertically with the pitch adjustment mechanism 22. Referring now to FIG. 2, it will be seen that a fixed mask 24 which is stabilized on the gimbal 29 is provided to have a fixed relationship with the host aircraft. As the aircraft rolls substantially, the 90° roll indicia 25 appears at a mid-point in the grid system, as will become hereinafter more fully apparent.

A pointer bar assembly 30 is attached to the gyroscope 31 and pivots about the pointer bar arm assembly pivot 32. The pivot 32 is a point type pivot about a bearing and has been designed for a minimum of friction in operation.

The pointer bar activator shaft 34 is fixed to the gyroscope 31, and nestles within the pointer bar activator slot 37 to move the pointer bar vertically and thereby coordinate the motion of the movable mask with regard to the miniature aircraft symbol.

In order to limit the amount of travel of the movable mask, a pair of pointer stop pins 35 are provided in the gimbal 29 to limit travel, the pointer bar activator shaft 34 then moving within the pointer bar side plate 38 through the open area as indicated.

Referring now to FIG. 3, it will be seen that a pointer bar connecting rod arm 39 has been provided to form one portion of the pointer bar assembly 30, along with the pointer bar bearing arm 40 which in turn attaches to the pointer bar bearing 41. As shown in FIGS. 4 and 9, the pointer bar bearing 41 is received at both ends by means of conical pointer bar assembly pivots 43. A plurality of weight relief holes 42 are provided along the pointer bar connecting rod arm 39 and the pointer bar bearing arm 40. On the other hand, in order to adequately counter-balance the unit from frictionless pivotal motion, a pointer bar assembly counterweight 36 is provided at the rear end portion of the pointer bar bearing arm 40.

Connecting rod adjustable mounting holes 44 are provided at the forward portion of the pointer bar connecting rod arm 39, and are elongated in their configuration in order to provide for adjustment with the connecting rod 45.

Referring now to FIGS. 6, 7, and 8, it will be seen that the connecting rod 45 has a connecting rod attachment arm 46 and a connecting rod set of attachment holes 48. A movable mask connection 49 is provided at one end of the connecting rod 45 and substantially transverse to the connecting rod attachment 46. As will be seen in FIG. 13, the connecting rod attachment arm 46 and the movable mask connection 49 are attached to the movable mask 50 by means of their nestling within the movable mask mounting boss 51 and its associated movable mask mounting slot 52. As indicated in FIG. 13, a permanent cement 54 is provided in order to furnish a bond between the movable mask connection 49 and the mounting boss 51.

As best shown in FIGS. 14 and 15, the permanent mask 24 is provided with an extreme attitude warning flag or band 55, preferably painted with a daylight fluorescent orange or red material. This band at the mid-portion of the fixed mask 24 is preferably flanked by a blue color above, and a black color below. The fixed mask, as indicated above, is secured to the gimbal 29 and the housing 12 by means of the fixed mask mounting bracket 59. FIGS. 16 and 17 illustrate how the extreme attitude warning band 55 appears in extreme attitudes of dive and climb respectively.

Referring now to FIG. 18, it will be seen that by merely employing the movable mask 50 in its connected relationship with the movable mask connection 49 and the connecting rod 45, by means of the fastening screws 60, the assembly of the movable mask to the connecting rod assembly is virtually completed. Sets of rivets 61 are employed to attach the pointer bar side plate 38 to the pointer bar connecting rod arm 39 and the pointer bar bearing arm 40. The pointer bar bearing 41 and its associated counter-weight 36 complete the assembly. Therefore there appear to be but five parts required for the assembly, in addition to the modification of the miniature aircraft where desired in order to produce a depth effect of the miniature aircraft as indicated in the side view thereof in FIG. 2. The entire assembly is inexpensive to manufacture and fabricate, and admits of ready adjustment for modification by field personnel at accepted instrument repair stations rather than requiring complex factory modification to achieve the advantage of the invention by means of modification of existing equipment. The bright color bands 17 on top of the miniature aircraft 15, particularly when the miniature aircraft has some depth, permit the pilot to readily spot the position of his miniature aircraft, and compare the same with the grid reference on the movable mask as well as the warning bands where indicated in extreme attitude.

Although particular embodiments of the invention have been shown and described in full here, there is no intention to thereby limit the invention to the details of such embodiments. On the contrary, the intention is to cover all modifications, alternative embodiments, usages and equivalents of the attitude indicator or artificial horizon as fall within the spirit and scope of the invention, specification and appended claims.

I claim:

1. An attitude indicator with a viewing window comprising, in combination, a housing, a gyro, means within the housing rotatable relative thereto about a horizontal longitudinal axis and mounting said gyro for pivotal motion thereon about a horizontal transverse axis, a pointer bar assembly pivotally mounted on the mounting means for the gyro and coupled to receive the pivotal motion of the latter, a first mask movable with the pointer bar assembly and covering the major portion of the viewing window, means connecting said movable mask to said pointer bar assembly and transversely thereof, a second mask fixed to said gyro mounting means between the movable mask and the gyro and covering the viewing window opening, a contrasting colored band positioned transversely on the fixed mask at a mid-portion thereof, a terrain reference on the movable mask, said terrain reference having a plurality of converging lines directed at a vanishing point at the center of the movable mask, the converging lines being separated by fixed intervals, at least two fixed grid lines horizontally intersecting said converging lines, and a climb reference dot above said vanishing point, the area above said vanishing point contrasting in color with the area below the vanishing point, and a miniature aircraft symbol secured to said housing in front of the movable mask, the whole being proportioned and oriented to show angle of bank by reference to the converging lines and angle of dive by reference to the grid lines and warn of extreme attitudes when the contrasting color on the fixed mask is exposed.

2. An attitude indicator comprising, in combination, a housing, a gyro, means within the housing rotatable relative thereto about a horizontal longitudinal axis and mounting said gyro for pivotal motion thereon about a horizontal transverse axis, a pointer bar assembly pivotally mounted on the mounting means for the gyro and coupled to receive the pivotal motion of the latter, a first mask movable with the pointer bar assembly, means connecting said movable mask to said pointer bar assembly and transversely thereof, a second mask fixed to said gyro mounting means between the movable mask and the gyro, a contrasting colored band positioned transversely on the fixed mask at a mid-portion thereof, a terrain reference on the movable mask, said terrain reference having a plurality of converging lines directed at and tapering toward a vanishing point at the center of the movable mask, the converging lines being separated by fixed intervals, grid lines horizontally intersecting said converging lines, the area above said vanishing point contrasting in color with the area below the vanishing point, and a miniature three dimensional aircraft symbol secured to said housing in front of the movable mask, the whole being proportioned and oriented to show angle of bank by reference to the converging lines and angle of dive by reference to the grid lines and warn of extreme attitudes when the contrasting color on the fixed mask is exposed.

References Cited by the Examiner

UNITED STATES PATENTS

| | | | |
|---|---|---|---|
| 2,293,092 | 8/42 | Wittkuhns | 33—204.2 |
| 2,485,552 | 10/49 | Aumuller | 33—204.2 |
| 2,504,114 | 4/50 | De Martino | 33—204.2 X |
| 3,037,382 | 6/62 | Aid et al. | 73—178 |

FOREIGN PATENTS

| | | |
|---|---|---|
| 791,315 | 9/35 | France. |
| 1,205,406 | 8/59 | France. |
| 511,742 | 8/39 | Great Britain. |
| 671,411 | 5/52 | Great Britain. |

ROBERT B. HULL, *Primary Examiner*.